F. C. MODER.
Plaster-Sower.
No. 161,145. Patented March 23, 1875.
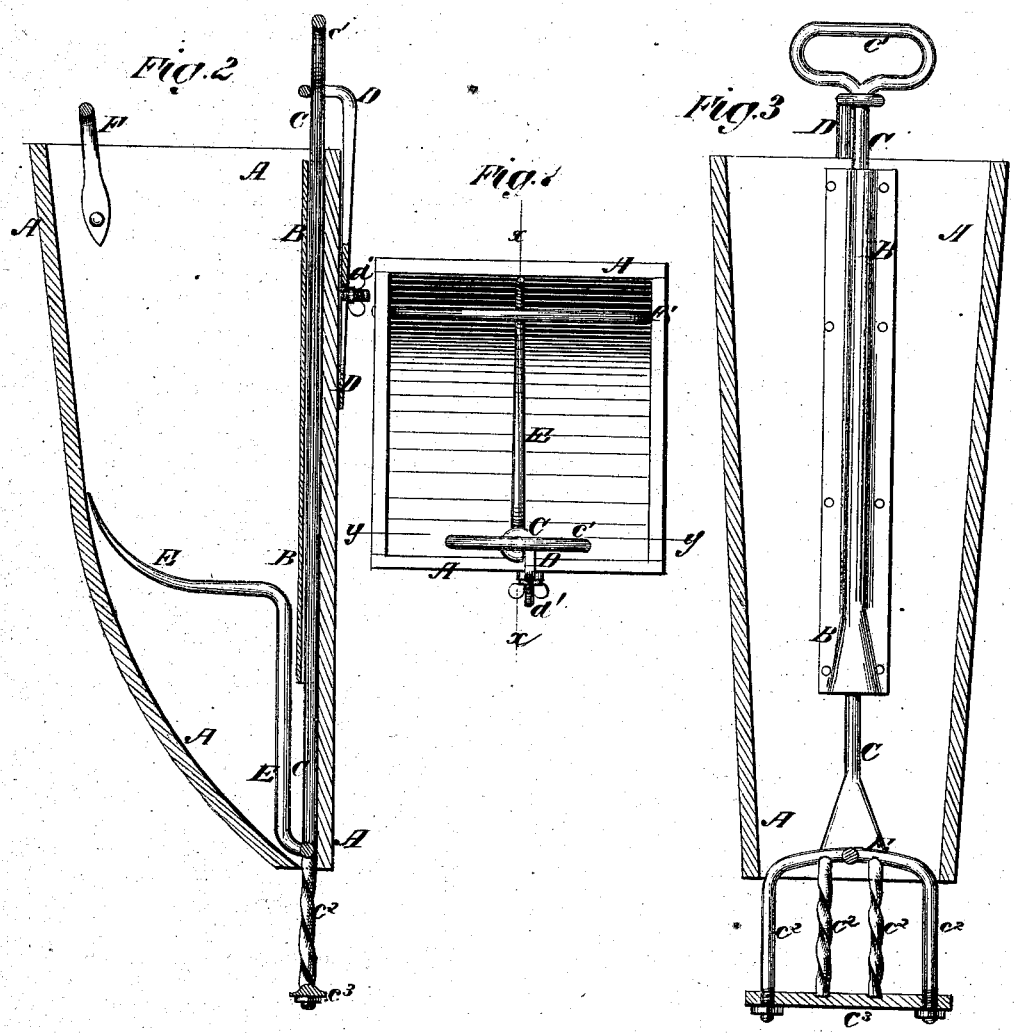

UNITED STATES PATENT OFFICE.

FRANK CHARLES MODER, OF HORTONVILLE, WISCONSIN.

IMPROVEMENT IN PLASTER-SOWERS.

Specification forming part of Letters Patent No. 161,145, dated March 23, 1875; application filed January 25, 1875.

*To all whom it may concern:*

Be it known that I, F. CHARLES MODER, of Hortonville, in the county of Outagamie and State of Wisconsin, have invented a new and useful Improvement in Plaster-Sowers, of which the following is a specification:

Figure 1 is a top view of my improved plaster-sower. Fig. 2 is a vertical section of the same, taken through the line $x\ x$ of Fig. 1. Fig. 3 is a vertical section of the same, taken through the line $y\ y$ of Fig. 1.

The invention will first be fully described, and then pointed out in the claim.

A is the box, the sides of which are slightly tapering, the rear side vertical, and the front side curved inward, so as to leave a narrow slit or opening between its lower end and the lower end of the rear side. To the inner surface of the rear side of the box A is attached a long keeper or guide, B, through which passes a rod, C, having a handle, $c^1$, formed upon its upper end. Upon the lower end of the rod C are formed four tines, $c^2$, the two outer ones of which are made smooth, and the two inner ones are made twisted or spiral. The two outer tines are made longer than the others, pass through holes in the end parts of a short cross-bar, $c^3$, and have screw-threads cut upon them to receive the nuts by which said bar $c^3$ is secured in place. The lower ends of the two inner tines $c^2$ rest in recesses formed in the upper side of said cross-bar $c^3$. The upper side of the cross-bar $c^3$ is rounded off or made V-shaped, to scatter the plaster as it escapes from the box A. As the rod $c$ is moved up and down, the plaster is rubbed out by the tines $c^2$, and is scattered over the plants by the cross-bar $c^3$. The upward movement of the rod C is limited by its lower part striking against the lower end of the guide-keeper B. The downward movement of the rod C is limited by its handle $c^1$ striking against an eye formed upon the upper end of a rod, D, through which eye the said rod C passes. The rod D is bent at right angles, passes down along the outer surface of the rear side of the box A, and is slotted to receive the bolt $d'$, attached to the said rear side, and is secured in place by a hand-nut screwed upon the said bolt $d'$. By this construction, by loosening the nut of the bolt $d'$, the stop-rod D may be moved up and down to limit the downward movement of the rod C, and thus regulate the quantity of plaster sown. To the rod C, at the base of the tines $c^2$, is attached a rod E, which projects upward, and is bent forward, as shown in Fig. 2, and which is designed to keep the plaster stirred up, so that it may pass down and out freely. To the upper part of the sides of the box A are attached the ends of a cross-bar or loop, F, to serve as a handle for carrying the sower. The sower may be supported, if desired, by a strap passed through the loop F, and over the shoulder of the person carrying it.

Having thus described my invention, I claim as new, and desire to secure by Letters Patent—

The combination, with box A, of the crooked stirrer E and reciprocating distributer $c^1\ c^2\ c^3$, all constructed and arranged substantially as and for the purpose specified.

FRANK CHARLES MODER.

Witnesses:
MATHEW McCOMB,
MARY J. McCOMB.